US007004393B2

(12) United States Patent
Schum et al.

(10) Patent No.: US 7,004,393 B2
(45) Date of Patent: Feb. 28, 2006

(54) METHOD AND APPARATUS FOR PROCESSING AND DETERMINING THE ORIENTATION OF DOCUMENTS

(75) Inventors: Michael Schum, Cherry Hill, NJ (US); Hayduchok L. George, Mt. Holly, NJ (US); William L. Heins, III, Medford, NJ (US)

(73) Assignee: Opex Corporation, Moorestown, NJ (US)

( * ) Notice: Subject to any disclaimer, the term of this patent is extended or adjusted under 35 U.S.C. 154(b) by 0 days.

(21) Appl. No.: 10/444,688

(22) Filed: May 22, 2003

(65) Prior Publication Data

US 2004/0108382 A1 Jun. 10, 2004

Related U.S. Application Data

(63) Continuation of application No. 09/804,359, filed on Mar. 12, 2001, now abandoned, which is a continuation of application No. 08/899,433, filed on Jul. 24, 1997, now abandoned.

(60) Provisional application No. 60/022,709, filed on Jul. 26, 1996.

(51) Int. Cl.
*G06K 7/10* (2006.01)

(52) U.S. Cl. .......................... 235/462.08; 235/462.09; 235/462.1

(58) Field of Classification Search ........... 235/462.08, 235/462.09, 462.1, 462.16, 462.31, 462.11; 382/183, 312, 317, 318, 319
See application file for complete search history.

(56) References Cited

U.S. PATENT DOCUMENTS

| 4,783,825 A | 11/1988 | Hirose et al. |
| 4,798,278 A | 1/1989 | Cornacchia |
| 4,863,037 A | 9/1989 | Stevens et al. |
| 4,948,955 A | 8/1990 | Lee |
| 4,988,852 A | 1/1991 | Krishnan |
| 5,120,940 A | 6/1992 | Willsie |
| 5,274,567 A | 12/1993 | Kallin et al. |
| 5,293,431 A | 3/1994 | Hayduchok et al. |
| 5,369,258 A | 11/1994 | Sansome et al. |
| 5,468,945 A * | 11/1995 | Huggett et al. ........ 235/462.02 |
| 5,525,786 A * | 6/1996 | Dumont ................. 235/462.14 |
| 5,525,788 A | 6/1996 | Bridgelall |
| 5,557,091 A | 9/1996 | Krummel |
| 5,649,026 A | 7/1997 | Heins, III |
| 5,652,802 A | 7/1997 | Graves et al. |
| 5,675,671 A | 10/1997 | Hayduchok et al. |
| 5,988,505 A | 11/1999 | Shellhammer |
| 6,000,618 A | 12/1999 | Saporetti |

* cited by examiner

*Primary Examiner*—Karl D. Frech
(74) *Attorney, Agent, or Firm*—Stephen H. Eland; Dann, Dorfman, Herrell and Skillman

(57) ABSTRACT

An apparatus is provided for determining the orientation of documents based upon the acquisition of images of the documents and the detection of barcode images from the documents. A document transport conveys documents along a selected path of movement. A document imaging system is provided along the path of movement for imaging a document conveyed along the path of movement to generate image data representative of the document. A system controller processes the image data to detect the presence of a barcode image. The location and/or orientation of the barcode image is then used to determine the orientation of the document along the path of movement. A document orientor may be provided along the path of movement to orient documents into desired orientations along the path of movement based upon the location and/or orientation of the detected barcode images.

23 Claims, 5 Drawing Sheets

METHOD AND APPARATUS FOR PROCESSING AND DETERMINING THE ORIENTATION OF DOCUMENTS

CROSS-REFERENCED TO RELATED APPLICATION

This application is a continuation of application Ser. No. 09/804,359, filed Mar. 12, 2001, abandoned, which is a continuation of application Ser. No. 08/899,433 abandoned, filed Jul. 24, 1997, which claimed priority to Provisional Application No. 60/022,709, filed Jul. 26, 1996. The aforementioned applications are hereby incorporated herein by reference.

FIELD OF THE INVENTION

The present invention relates to a method and apparatus for processing and determining the orientation of documents and, more particularly, to a method and apparatus for determining the orientation of documents based upon the detection of barcodes on the documents.

BACKGROUND OF THE INVENTION

Automated and semi-automated machines have been employed for processing documents such as bulk mail. Due to the large quantity of mail received by many companies, there has long been a need for efficient sorting of incoming mail. Document sorting has become particularly important in the area of remittance processing.

Utility companies, phone companies, and credit card companies routinely receive thousands of payment envelopes from their customers on a daily basis. Typically, a customer payment envelope contains an invoice stub and some type of customer payment, usually in the form of a bank check or money order.

In order to perform remittance processing, the remittance transaction is initially extracted from the envelope. In some instances, the extraction may be done manually. In other instances, the extraction may be done in an automated manner. Regardless of the manner in which the remittance transactions are extracted, further processing of the invoices and accompanying checks is still required before remittance processing can be effected.

Remittance processing equipment typically requires each batch of remittance transactions to be organized so that each invoice-check pair is properly ordered and oriented. For example, conventional remittance processing equipment may require each transactional pair of documents to be ordered so that the invoice is positioned in front of or on top of each check. Furthermore, each invoice and each check must be oriented in a right-side-up, face-forward orientation. To determine the orientation of checks, magnetic imaging devices have been utilized to detect the location of the MICR line on the checks. Because the location of the MICR line is generally fixed, the magnetic imaging modules can determine the orientation of a check based on the location of the MICR line. However, documents such as invoices do not include a MICR line, and the printing on invoices varies widely among the different companies issuing invoices.

In accordance with the present invention, an apparatus and method are provided for detecting the orientation of documents based upon the detection of a POSTNET code printed on the documents and for thereafter reordering and reorienting the documents, as necessary, for subsequent remittance processing.

SUMMARY OF THE INVENTION

The present invention relates to a method and apparatus for processing documents. More specifically, the present invention relates to a method and apparatus for determining the orientation of documents based upon the acquisition of document images and the detection of a selected marking image such as a barcode image from the documents.

The apparatus in accordance with the present invention includes a document transport for conveying documents along a selected path of movement. A document imager functions to acquire an image of a document conveyed along the selected path of movement. Image data representative of the document is stored by the document imager to provide a document image. A system controller is provided for processing the image data. More specifically, the system controller scans the stored document image along a selected scan line until a mark is detected. A mark may be detected at an area of light transition in the document image. Next, the system controller scans the image along a vertical scan line in a selected vertical direction from the mark until a selected light transition point is detected. Next, the system controller scans the image from a selected starting point located at a selected horizontal distance from the light transition point along a horizontal scan line through the light transition point. The system controller then determines the light transition pattern along the horizontal scan line to detect the presence of a barcode image. The system controller then determines the orientation of the document based on the barcode image. The orientation of the barcode image may be utilized to determine the orientation of the document. In another application, the detection of the location of barcode image at selected symmetrical areas on the document may be used to determine document orientation.

Pursuant to the method of the present invention the document is imaged to acquire image data representative of the document. The image data is then stored to provide a document image. The image is then scanned along a selected line until a mark is detected. Next, the image is scanned along a vertical scan line in a selected vertical direction from the mark until a selected light transition point is detected. The image is scanned along a horizontal scan line for a selected distance in a horizontal direction through the transition point. For this purpose, a selected horizontal scan starting point may be selected at a selected horizontal distance from the light transition point. The light transition pattern along the horizontal scan line is then determined to detect the existence of a barcode image. The orientation of the document is then determined based upon the detection of the barcode image. For example, the orientation of the document may be determined based upon the orientation of the detected barcode. Alternatively, document orientation may be determined based upon the detection of a barcode image at selected symmetrical areas of the document.

BRIEF DESCRIPTION OF THE DRAWINGS

The foregoing summary, as well as the following detailed description of the preferred embodiments of the present invention, will be better understood when read in conjunction with the appended drawings, in which.

DETAILED DESCRIPTION OF THE PREFERRED EMBODIMENTS

Figure 1:
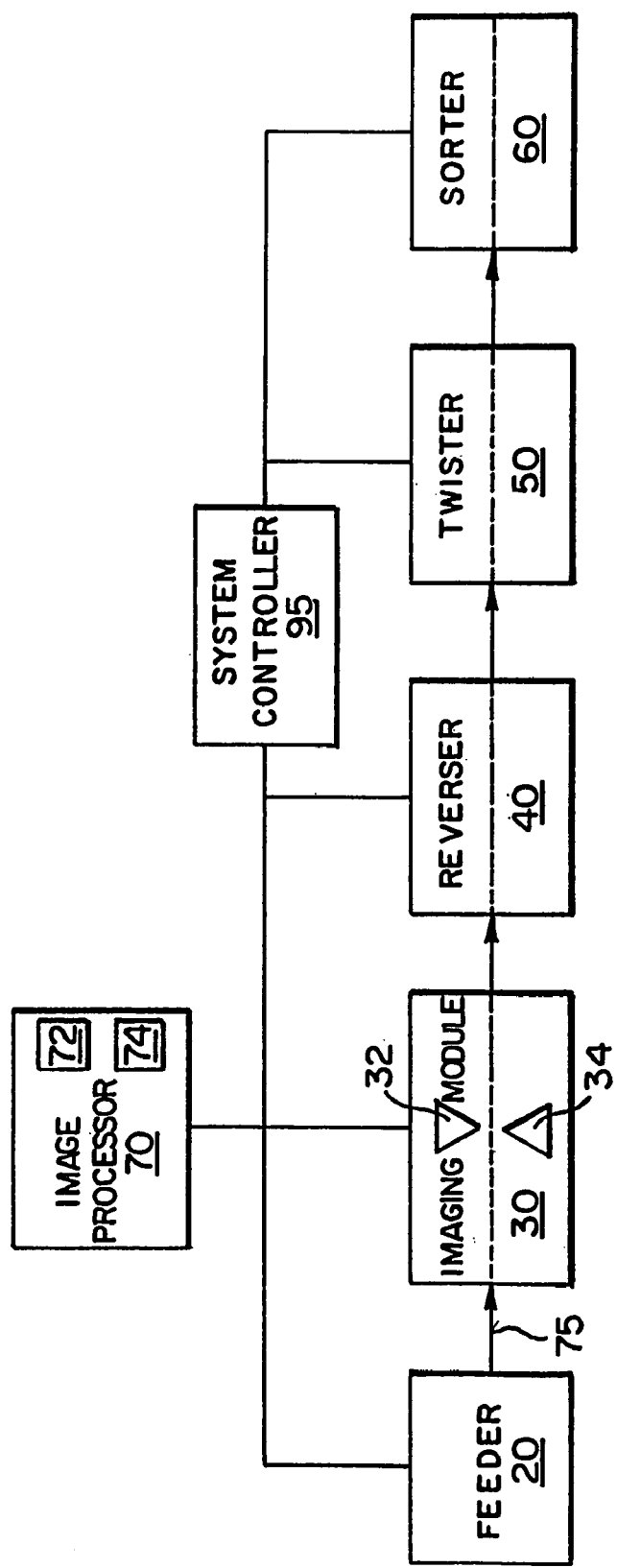
FIG. 1 is a block diagram showing the flow of documents through an automated document processing apparatus in accordance with the present invention.

Referring now to the drawings in general and FIG. 1 specifically, an apparatus 10 for processing documents that have a pre-printed POSTNET barcode is illustrated. By determining the presence and location or orientation of the POSTNET barcode on a document, the apparatus is able to determine the orientation of the document.

After determining the orientation of the document, the orientation detector can then cooperate with a machine capable of selectively reorienting and sorting documents such as the model 150 mail sorting machine sold by Opex Corporation.

Referring now to FIG. 1, to begin processing a stack of documents, the documents are placed in a feeder 20. The documents may include transactional pairs of documents such as invoices and corresponding checks to be oriented and ordered for remittance processing. A system transport conveys the documents to an imaging module 30, which scans selected documents in the document flow, such as invoices, to obtain image data representative of the documents. The image data is communicated with an image processor 70, which analyzes the image data for each selected document to determine the orientation of the documents. The image controller 70 communicates the orientation information to a system controller 95. The system controller 95 is a microprocessor that controls the operation of the apparatus in response to signals received from the various components of the apparatus.

From the imaging module the system controller 95 controls the flow of the documents to selectively reorient the documents in response to the orientation data for each document received from the imaging module 70. To reorient the documents, the documents are first conveyed to a reverser 40 that selectively reorients the documents by reversing the leading and trailing edges of select documents to flip the documents from front to back. The documents are then conveyed to a twister that selectively reorients documents by rotating select documents horizontally to twist the documents from top to bottom and from front to back. The system transport 75 conveys the oriented documents to a stacker, which sorts and stacks the documents into bins.

Fixed Position Barcode Orientation Detection

Figure 2:
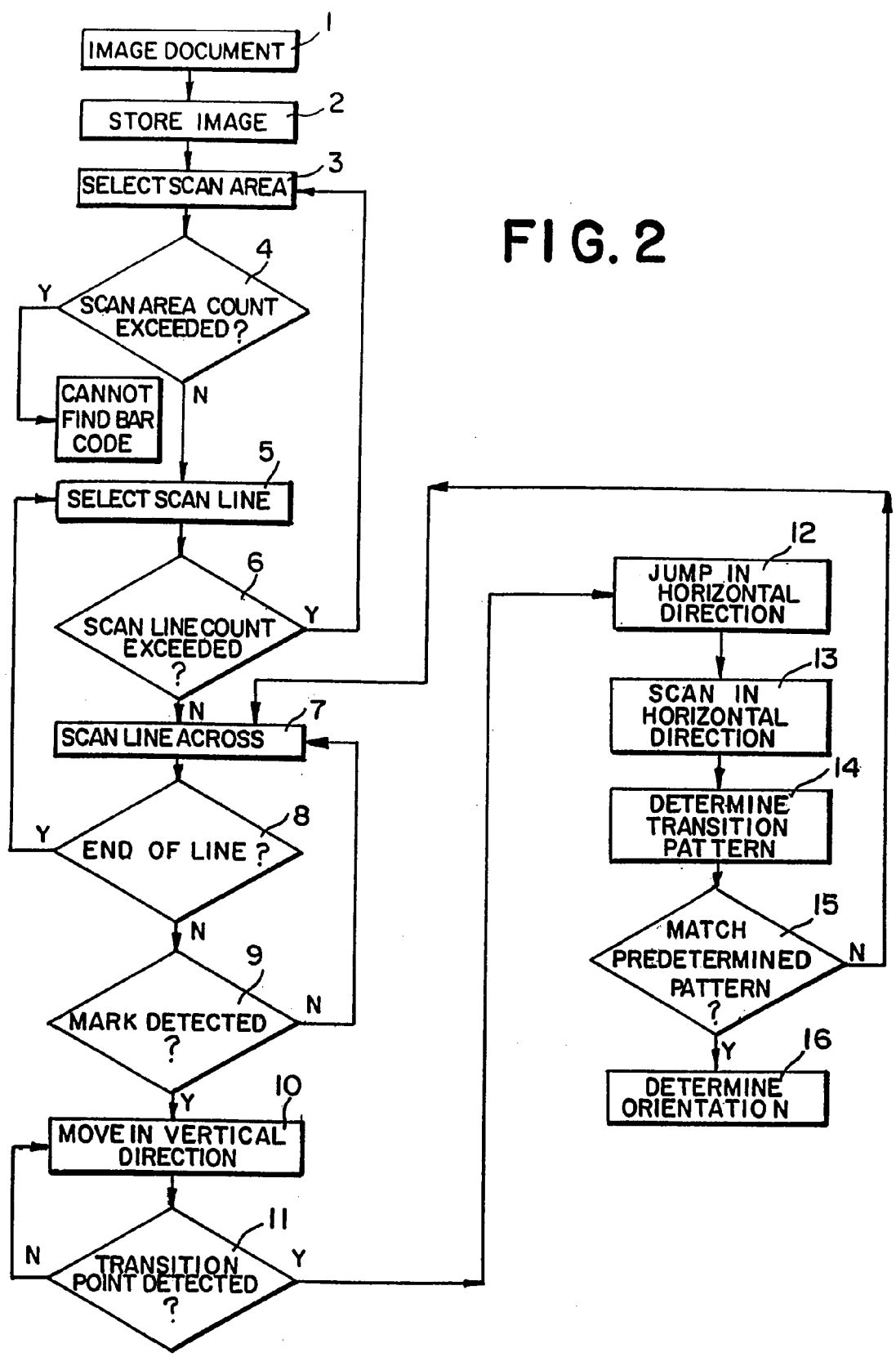
FIG. 2 is a block diagram showing the flow of data according to the fixed position analysis.

Referring now to FIGS. 1 and 2, the orientation detector 10 operates in a series of steps to determine the orientation of a document. In the first step, a system transport 75 conveys a document to an imaging module 30 to scan the image of the document. The imaging module includes at least one, and preferably two high speed CCD line scan cameras 32 and 34. The cameras are disposed on opposing sides of the system transport 75 to acquire image data representative of both faces of each document passing through the imaging module 30.

The cameras 32 and 34, image a document by scanning the document along a series of lines to determine the light intensity at various points or pixels on each line. The cameras are matched to the speed of the system transport 75 to obtain an image resolution of at least approximately 80 dpi×80 dpi. The light intensity of each pixel is represented by a gray scale number ranging from 0 (black) to 255 (white). In step 2 the image data acquired for a document is communicated with an image processor 70. The image processor includes a microprocessor 72 and a memory 74 sufficient to store the image data for at least two documents. The image processor receives the image data from the cameras 32, 34 and stores the data in memory 74. The microprocessor 72 analyzes the image data for a document that is in the memory 74 to determine the orientation of the document as is further discussed below in steps 3 through 16. While the microprocessor is analyzing the data in the memory, image data for the next document in the flow of documents is received by the image processor 70 and stored in memory. Once the image processor has completed analyzing the image data for a document, the image data is overwritten by the data for the next image to allow continuous processing and storage of image data.

In step 3, the image processor 70 begins analyzing the image data for a particular document by selecting a scan area. Scan areas represent areas of the image in which the POSTNET barcode for a particular type of document may appear. The POSTNET barcode ("barcode") represents information such as a zip code that the United States Postal service uses to sort mail. Companies print the barcode on documents and envelopes because the United States Postal Service charges lower postage rates when the barcode is preprinted on the document to be delivered.

Figure 3:
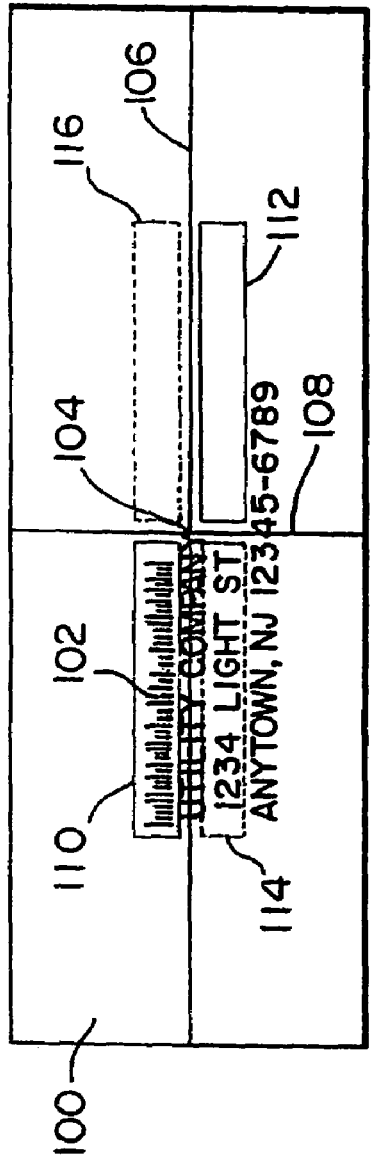
FIG. 3 is the front face of an envelope illustrating the scanned areas used in the fixed position analysis.

The scan areas are located so that the barcode for a particular document will only appear in one of the scan areas, depending on the orientation of the document. Therefore, once the image processor determines the area in which the barcode is located, the orientation of the document can be determined. The scan area locations are based on the location of the barcode on the document, which can vary from document to document. Therefore, the location of the scan areas is particular to the document being processed. For example, an invoice 100 from an utility company may have a barcode 102 pre-printed above the address so that the scan areas are located as shown in FIG. 3. An invoice from a cable company may have the barcode located below the address. Therefore, the scan areas for the cable invoice are located in different positions than scan areas for the utility invoice so that the invoices from the utility company are grouped together and processed separately from the cable invoices.

Referring now to FIG. 3, the scan areas operate similar to a template defining areas in which the barcode can appear. In other words, if a template is placed over the document, the scan areas are windows through which the barcode would be visible if the barcode is present on the document. Therefore, to define the scan areas, the location of the barcode for a particular type of document must be known. For example, referring to FIG. 3, a barcode 102 is pre-printed on the invoice 100 above the return address for the utility company so that for every invoice that the utility company sends to its customers on this form of invoice, the location of the barcode is fixed. For the invoice 100 shown in FIG. 3, the first scan area 110 is located in the area in which the barcode is located if the invoice is oriented right-side-up facing forward. The second scan area 112 is located symmetrically to the first scan area about the center point 104 of the invoice. In this way, the barcode 102 will be located in the second scan area 112 if the invoice is oriented upside-down facing forward. These two scan areas 110 and 112 define the areas that are analyzed for the image of a face of a document scanned by the first camera 32. A similar pair of scan areas 114 and 116 define the areas that are analyzed for the image of the opposite face of the document scanned by the second camera 34. The second pair of scan areas 114 and 116 are located symmetrically to the first scan areas 110 and 112 about the horizontal 106 or vertical 108 center lines of the document. In this way, if the document is oriented facing backward, the barcode 102 will appear in one of the second pair of areas 114 and 116. If the document is oriented right-side-up facing backward the barcode 102 will appear in scan area 116. If the document is oriented upside-down facing backward the barcode 102 will appear in scan area 114. All four of the scan areas 110, 112, 114, and 116 are the same size and each area is larger than the size of the barcode 102 pre-printed on the document. The larger size compensates for variations in the position of the documents, which leads to variations in the position of the barcode as the documents are processed.

In step 4, the image processor 70 checks whether all four scan areas 110, 112, 114, and 116 have been scanned. If all four scan areas have been analyzed and the barcode has not been identified, then the image processor 70 indicates that the orientation was not determined and communicates this information to the system controller 95. The system controller 95 then electronically tags the document as having an undetermined orientation and directs the document to a reject bin. If all four scan areas 110, 112, 114, and 116 have not been selected, then the image data for the scan areas selected in step 3 are analyzed by the image processor 70 to determine whether the barcode is located in the scan area.

Figure 4:
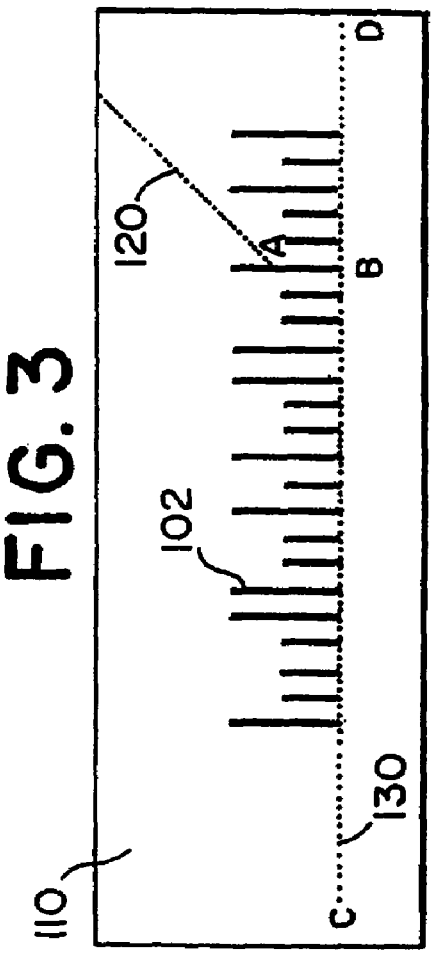
FIG. 4 is an enlarged fragmentary view of one of the scanned areas for the envelope illustrated in FIG. 3.
Figure 5:
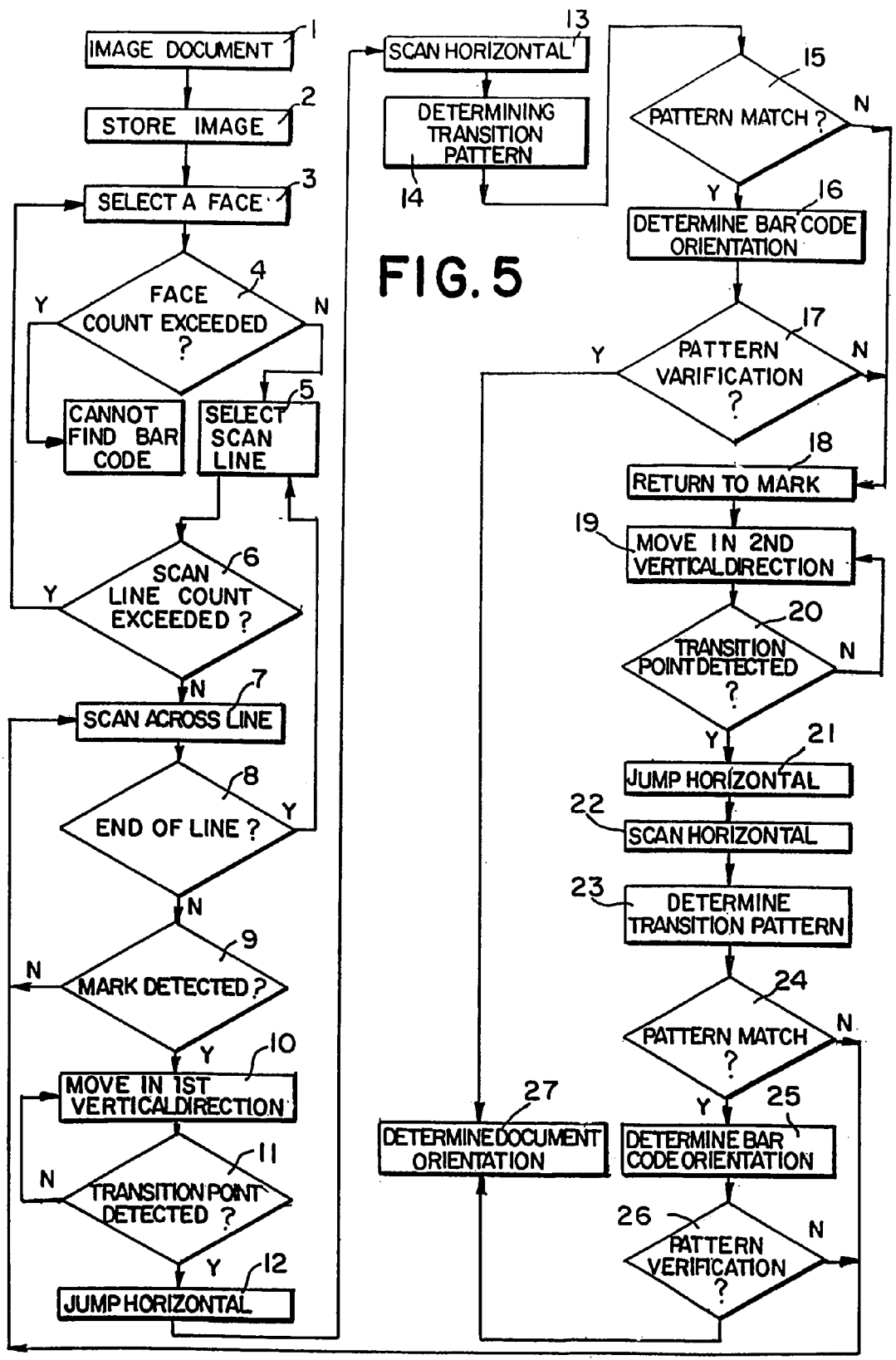
FIG. 5 is a block diagram showing the flow of data according to a wide area scan.

According to step 5, the image processor selects a scan line 120 within the scanned area selected in step 3. The scan line is a line extending through the scanned area that the image processor analyzes to determine whether the line intersects the barcode. Although the orientation of the scan line can vary, in the present instance the scan line 120 extends away from the upper edge of the scanned area 110 at an angle of 45° as is shown in FIG. 4 which is an enlarged view of the scan area 110 in FIG. 3. The first scan line in an area extends from the upper leading edge of the scan area and successive scan lines are spaced apart approximately one inch. A horizontal scan line can be used, but the spacing between adjacent scan lines must be less than the height of the tall bars in the barcode to ensure that the barcode does not fall within adjacent scan lines, which would result in a failure to locate the barcode. Similarly a vertical scan line can be used, but the spacing between adjacent scan lines must be less than the width of the bars in the barcode to ensure that the barcode does not fall within adjacent scan lines. In addition, a scan line having an angle other than 45° can be used, but the number of scan lines required to scan an area is increased relative to when a 45° angle is used.

In step 6, the image processor determines whether the entire scan area has been scanned by scan lines. If the entire area has been scanned then the image processor selects another scan area as described in step 3. If the entire scan area has not been scanned, the image processor 70 proceeds to step 7.

The image processor analyzes the pixels on the scan line 120 in steps 7, 8, and 9 to determine whether the scan line intersects a dark pixel which would indicate the presence of a mark. In step 7, the image processor identifies the first two pixels on the scan line and identifies the gray level for the pixels. As described below in step 9 the image processor analyzes the gray level for the pixels to determine if the second pixel represents a mark. If a pixel does not represent a mark, the image processor progresses along the scan line analyzing successive pixels until a mark is detected or the end of the scan line is reached. If the image processor reaches the end of a scan line without detecting the barcode, the image processor selects another scan line as described above in step 5.

Step 9 identifies whether a pixel indicates the presence of a mark. A local area threshold is utilized to determined whether a pixel is a mark. According to this method, the image processor compares the light intensity of a pixel with the light intensity of the adjacent preceding pixel along the scan line 120. If the light intensity of the second pixel is less than the light intensity of the first pixel by a specified parameter, then the second pixel is designated as a mark and processing continues according to step 10. Otherwise, the image processor continues along the scan line 120 to the next pixel, which is then compared to the preceding pixel. The specified parameter that is used to compare successive pixels can be set forth in terms of the numerical difference in gray scale levels or the percentage difference in gray scale levels. In the present instance, the specified parameter is a gray scale difference of 30%. For example, if the gray scale levels of the first and second pixels along a scan line are 150 and 140 respectively, the gray scale of the second pixel is not 30% less than the first pixel, so the second pixel is not designated as a mark. If the gray scale level of the third pixel along the is 95, then the third pixel is designated as a mark because the third pixel is more then 30% darker than the second pixel.

After a mark is detected, the image processor 70 attempts to find the "bottom" of the mark. As illustrated in FIG. 4, if the diagonal scan line 120 crosses the barcode at point A, point A is indicated as a mark. As will be discussed later in steps 13–15, a horizontal line 130 is scanned to determine whether the barcode is present. If the horizontal scan line is located at point A, then the horizontal scan line 130 will not pass through the small bars in the barcode. Consequently, the transition pattern will not be properly identified and the image processor will determine that point A is not part of a barcode. Therefore, the image processor scans vertically in an attempt to find the bottom of the mark to determine whether the mark is part of the barcode. If the mark is a barcode, then by finding the bottom of the mark, the horizontal scan line will pass through the short bars as well as the tall bars so that the transition pattern can be properly identified.

Whether the image processor scans up or down to find the bottom of the mark depends on which scan area the image processor is analyzing. For example, referring to FIG. 3, if a document is in a right-side-up orientation the barcode 102 will appear in either scan area 110 or 116 depending on whether the document is facing forward or facing backward. If the document is right-side-up then the barcode 102 is also right-side-up. Therefore, if a point on the barcode is identified, the bottom of the barcode can be identified by moving vertically downward. Conversely, if the image processor is analyzing scan areas 114 or 116, the bottom of the barcode is located by moving vertically upward. Referring to the example in FIG. 4, the scan area being analyzed is scan area 110. Therefore the image processor 70 analyzes the data by progressing vertically pixel by pixel from point A toward point B.

In step 11, the bottom of the mark is identified by using a local area threshold similar to that used in step 9. In step 11, the image processor progresses vertically comparing the light intensity of adjacent pixels. However, the image processor progresses along the vertical scan line until a transition from dark to light is detected, whereas in steps 7–9, the image processor progressed until a transition from light to dark was detected. In this way, the image processor 70 compares the intensity of the pixel identified as a mark in step 9 (i.e. point A) with the light intensity of the pixel that is vertically adjacent in the direction of the bottom of the mark. If the light intensity of the vertically adjacent pixel exceeds the light intensity of the first pixel (i.e. point A) by a specified parameter then a dark to light transition is detected and the image processor determines that the pixel is the bottom of the mark. The image processor then proceeds to step 12. In FIG. 4, the transition from dark to light indicating the bottom of the mark is designated point B. Conversely, if the light intensity of the vertically adjacent pixel does not exceed the light intensity of the first pixel by a specified parameter then the pixel is considered to be part of the mark identified in step 9 (i.e. point A). The image processor then continues to progress vertically to the next pixel toward the bottom of the mark as detailed in step 10. In this way, the image processor proceeds from point A to point B, comparing the light intensities of adjacent pixels.

According to step 12, once the bottom of the mark is located, the image processor shifts a predetermined distance horizontally away from the leading edge of the scan area. The horizontal shift is approximately one inch to a point designated C in FIG. 4.

In step 13, starting from the point at which the image processor horizontally shifted, the image processor scans horizontally in the direction of the point located at the bottom of the mark, until the image processor reaches the edge of the scan area. In other words, as illustrated in FIG. 4, the image processor scans the image data proceeding horizontally from point C toward point B along line 130 until the image processor reaches the edge of the scan area designated at point D.

In step 14, the image data acquired during step 13 is used to determine a transition pattern. The transition pattern reflects both the width of each mark as well as the width of the blank area or spaces between the marks. For example, referring again to FIG. 4, if each of the bars in the barcode is three pixels wide and each of the spaces is three pixels wide, the transition pattern would reflect the width of the bars and the width of the spaces between the bars.

To determine the transition pattern along the horizontal scan line 130, the image processor 70 applies a modified local area threshold to compare successive pixels along the scan line. The image processor analyzes the successive pixels along the scan line 130 to determine areas in which the darkness is increasing. For this purpose, the image processor uses a pair of counters, one counter for monitoring areas in which the darkness is increasing, referred to as a bar counter, and a second counter for monitoring areas in which the darkness is decreasing, referred to as a space counter. As the image processor analyzes the data along the scan line 130, the gray levels for successive pixels are compared. If the gray scale number for a pixel is greater than the gray scale number for the preceding pixel along the scan line, then the image processor determines that the darkness is decreasing. In response to the decreasing darkness, the image processor increments the space counter by one. If the next successive pixel has a gray scale number that is smaller than the gray scale number for the preceding pixel, then the image processor determines that the darkness is increasing. In response to the increasing darkness, the image processor increments the bar counter by one. Further, if the darkness changes from being increasingly darker to decreasingly darker, the image processor stores the number that is in the bar counter and then resets the bar counter. Similarly, if the darkness changes from being decreasingly darker to increasingly darker, the image processor stores the number that is in the space counter and then resets the space counter.

The following example illustrates the steps taken by the image processor to determine the transition pattern. Referring to FIG. 4, assume that each bar in the barcode is three pixels wide and the spaces between the bars are three pixels wide. As the image processor analyzes the data for the barcode along the horizontal scan line 130 from pixel to pixel the image processor detects a point of increasing darkness when it reaches the first bar in the barcode. At this point, the image processor resets the space counter and increments the bar counter to one. As the image processor progresses to the second pixel in the first bar, the darkness will likely increase again because middle pixel in a bar is generally darker then the pixels at the sides of the bar. Therefore, the image processor increments the bar counter to two. The image processor then progresses to the third pixel. The third pixel is located at the side of the bar, so that the third pixel is most likely brighter than the middle pixel. Therefore, the image processor stores the number in the bar counter, i.e. 2, resets the bar counter to zero, and increments the space counter to 1. The image processor then progresses to the next pixel which is the first pixel in the space between the bars. The space will be brighter than the preceding pixel on the bar, so the image processor increments the space counter to two. The image processor continues along the horizontal scan line in this way to obtain a transition pattern.

By using the above transition detection technique, a standard transition pattern for a barcode can be determined. The transition pattern for a series of characters, such as number and/or letter in an address, may be similar to the transition pattern for a barcode for a certain portion along a horizontal scan line. For example, a series of characters may match the transition pattern that represent ten bars in the barcode. However, if the transition pattern for a given scan line must match the transition pattern that represents twenty bars in a barcode, it is unlikely that the transition pattern for a character string will match the barcode transition pattern. In other words, as the number of bars represented in the predefined transition pattern is increased, the likelihood of obtaining a matching transition pattern that is not a barcode decreases.

In step 15, the transition pattern determined in step 14 is compared with a predetermined transition pattern which reflects a barcode transition pattern. If the transition pattern determined in step 14 matches the barcode pattern, then the image processor proceeds to step 16. If the pattern does not match the barcode pattern, the image processor returns to step 7. More specifically, if the pattern is not a barcode, the image processor returns to point A on the diagonal scan line 120 and continues to proceed along the diagonal scan line to find another mark.

In step 16, the orientation of the document is determined. As previously detailed, the scan areas are located so that the barcode will only appear in a single scan area. Therefore, the image processor determines the orientation of a document based upon the scan area in which the barcode for the document was located. Once the orientation of a document is determined, the image processor communicates a signal with the system controller 95 indicating the orientation of the document. The system controller then electronically tags the document so that the document is processed accordingly. In this regard, if the apparatus includes a reorientor, the system controller monitors the progress of the documents to selectively reorient the documents by selectively reversing and/or twisting the documents in response to the orientation information from the image processor.

Wide Area Barcode Orientation Detection

In accordance with the foregoing, the apparatus detected the orientation of a document based on the supposition that the barcode was located in a fixed position on the document. Based on this supposition, the image data for a given document can be analyzed at four discrete locations to determine the orientation of the documents rather than analyzing the image data for the entire document. However, in many circumstances the location of the barcode is not fixed. For example, when a group of invoices from different companies are processed together or when different style invoices from the same company are processed together the location of the barcode may not be fixed. In such instances, the data analysis is not restricted to predetermined portions of the image data. A wide area barcode orientation analysis ("wide area analysis") is applied wherein the entire document is analyzed to detect the location of the barcode. Once the barcode is located, the orientation of the barcode which corresponds to the orientation of the document, is then determined. In this way, the orientation of a document can be determined without knowing the location of the barcode on the document prior to processing the document.

The first two steps of the wide area analysis are similar to the first two steps in the previously described fixed position barcode orientation detection analysis ("fixed position analysis"). The cameras 32 and 34 scan a document to acquire a set of image data representative of the document. The image data is communicated with the image processor 70, which stores the image data in memory 74.

In step 3, the image data acquired by one of the cameras 32, 34 representative of a face of the document is selected. If both faces of the document have been analyzed and a barcode was not detected, then the image processor indicates that the orientation was not determined. The image processor 70 communicates this data to the system controller 95, which electronically tags the document as having an undetermined orientation and directs the document to a reject bin. If both faces have not been selected, then the image data for the face selected in step 3 is analyzed by the image processor to determine whether the barcode is located on the selected face.

Figure 6:
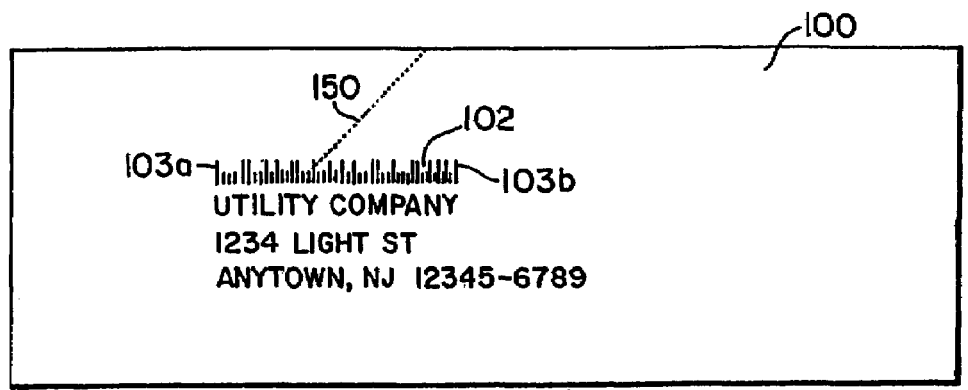
FIG. 6 is the front face of an envelope illustrating a diagram scan line used when applying the wide area barcode scan.

Step 5 of the wide area analysis is similar to step 5 of the fixed position analysis. The image processor 70 selects a scan line 150 on the face selected in step 3. The scan line is a line extending through the selected face. The image processor analyzes the points along the scan line 150 to determine whether the scan line intersects the barcode 102. Although the orientation of the scan line can vary, in the present instance the scan line extends away from the upper edge of the selected face at an angle of 45° as is shown in FIG. 6. When a 45° scan line is used, successive scan lines are spaced apart approximately one inch.

In step 6, the image processor determines whether the entire face has been scanned by scan lines. If the entire face has been scanned then the image processor selects another face as described in step 3. If the entire face has not been scanned, the image processor 70 proceeds to step 7.

In steps 7, 8, and 9 the image processor analyzes the pixels along the selected scan line 150 to determine whether the scan line intersects a mark. In step 7, the image processor moves along the scan line to the next pixel located on the scan line 150. In step 8, the image processor checks to see if it has reached the end of the scan line. If the image processor reaches the end of the scan line without detecting the barcode 102, the image processor selects another scan line as described in step 5.

In step 9 the image processor determines whether the pixel identified in step 7 represents a mark. To determine whether the pixel is a mark the image processor uses a local area threshold as described in connection with step 9 in the fixed position analysis.

In step 10, the image processor scans vertically in an attempt to locate the bottom of the mark detected in step 9. Step 10 is similar to step 10 in the fixed position analysis except that in the wide scan analysis the image processor does not know which direction to go vertically to find the bottom of the mark. Therefore, in step 10 of the wide scan analysis, the image processor moves vertically in a first selected direction. In the example illustrated in FIG. 7, the image processor moves vertically upward form point A toward point B.

Figure 7:
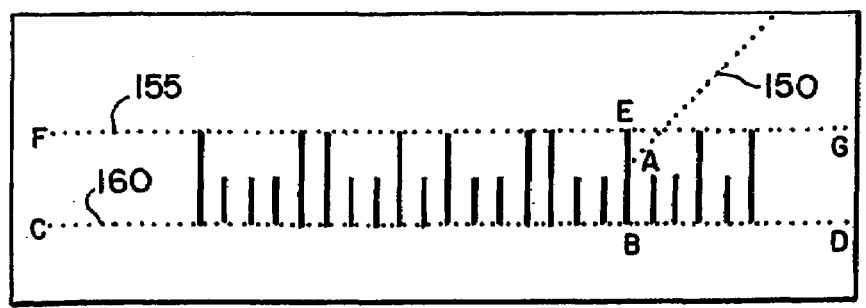
FIG. 7 is an enlarged fragmentary view of a portion of the envelope illustrated in FIG. 6.

Steps 11 through 15 are similar for both the wide scan analysis and the fixed location analysis. The image processor proceeds vertically upward comparing successive pixels using a local area threshold. Once the image processor detects a transition from black to white, the image processor shifts a predetermined distance horizontally away from the leading edge of the image. FIG. 7 illustrates this sequence in which the image processor moves upward from point A to point E where a black to white transition is detected. The image processor then shifts horizontally to point F. The image processor then scans along a horizontal line 155 toward the leading edge as indicated by point G. As the image processor scans horizontally the image processor detects the transition pattern. In step 15, the transition pattern acquired by scanning along the horizontal line is compared with a predefined transition pattern indicative of a barcode, if the transition pattern matches the predefined pattern, the image processor determines that the mark is a barcode and then proceeds to determine the orientation of the barcode in step 16. If the transition pattern acquired in step 14 does not match the predefined pattern, then the image processor proceeds to step 18 to attempt to locate a barcode.

In step 16, the image processor determines the orientation of the barcode located in steps 1–15. The process for determining the orientation of the bar code is detailed below in reference to step 25. Similarly, the verification process in step 17 is detailed below in reference to step 26.

In step 18, the image processor shift back to the point along the scan line at which a mark was detected in step 9. In other words, the image processor shifts from point G to point A in FIG. 7. The image processor shifts back to point A to make a second attempt to find the bottom of the mark. As explained earlier, in the wide scan analysis, the image processor does not know which way to proceed vertically to find the bottom of a mark, unlike the fixed position analysis in which the image processor knows which way to move vertically to find the bottom of a mark. Therefore, when the image processor moved upward in step 10, the image processor may have located the top of the mark and then determined the transition pattern for the top of the barcode, as illustrated in FIG. 7, when the image processor moved upward from point A to point E. In step 18, the image processor moves downward starting again from point A.

In steps 19 and 20, the image processor moves downward in an attempt to locate the bottom of the barcode. The image processor moves downward from point A comparing successive pixels using a local area threshold to identify a transition as in steps 10 and 11. FIG. 7 illustrates the sequence for the transition detection, wherein the image processor moves vertically from point A to point B.

Proceeding to steps 21 through 24, once the image processor locates the transition from black to white at point B, the image processor shifts horizontally to point C and then scans along a horizontal line 160 from point C toward the leading edge of the face, as indicated at point D. As the image processor moves along the horizontal line 160, the image processor analyzes the succeeding pixels to determine the transition pattern along the horizontal line. If the transition pattern matches a predefined transition pattern indicative of a barcode, then the image processor determines that the mark is a barcode and the image processor proceeds to step 25 to determine the orientation of the barcode. If the transition pattern for the horizontal line does not match the predefined transition pattern, then the image processor determines that the mark is not a barcode and the image processor returns to step 7 and continues to move along the scan line 150 to locate a mark.

When using the wide area scan, the barcode 102 on a document may appear anywhere on the document. Therefore, determining the location of the barcode is not sufficient information to determine the orientation of the document. In step 25, the image processor analyzes the image data to determine the orientation of the barcode. The orientation of the barcode is indicative of the orientation of the document because the barcode is printed on documents in the same orientation as the documents. If the barcode is oriented right-side-up, the document is oriented right-side-up; and if the barcode is oriented upside down, the document is oriented upside down.

Figure 8:
FIG. 8 is an enlarged view of a POSTNET barcode in an upside down orientation.

The orientation of a barcode refers to the direction in which the bars in the barcode extend. For example, as discussed previously, the bottom edge of the barcode in FIG. 7 is the edge intersecting the line extending from point C to point D. When the bottom edge of the barcode is below the top edge, the barcode is oriented upright, as illustrated in FIG. 7. Conversely, the barcode shown in FIG. 8 is oriented upside down because the bottom edge of the barcode is above the top edge.

To determine the orientation of a barcode identified in step 24, the image processor scans each bar to determine where each bar begins and where each bar ends. The data acquired during the horizontal scan in steps 22 and 23 is used to locate each bar in the barcode 102. The image processor then scans vertically along each bar using a local area threshold, as discussed in step 10, to identify the transitions defining the ends of each bar. In this way, the image processor determines which bars are short bars and which bars are tall bars. By comparing the tall bars and the short bars, the image processor determines whether the barcode is right-side-up or upside down.

Step 26 is a verification step that assures the mark identified is a barcode. Because the wide scan analysis is used to scan the entire face of a document, it may be possible for the image processor to encounter a group of marks or characters that have a transition pattern similar to a barcode. Therefore, when applying the wide scan analysis, the image processor follows an additional step to verify that the mark is a barcode. This verification step can also be included after step 15 in the fixed location analysis to reduce the possibility of incorrectly determining the orientation of document.

The image processor verifies that the mark is a barcode by comparing the number of tall bars to the number of short bars to determine whether the ratio of tall bars to small bars matches a predetermined ratio based on standards used for POSTNET barcodes. According to United States Postal system specifications, POSTNET barcodes are made up of a number of groups of bars. Each group of bars has five bars and each five-bar-group represents a single character, such as a number in a zip code. In addition, a tall bar 103a is located at the beginning of the barcode and another tall bar 103b is located at the end of the barcode to indicate the ends of the barcode 102. These two tall bars, referred to as framing bars, are not used to represent characters, i.e. the framing bars are separate from the five-bar-groupings that indicate characters. The United States Postal Service specifications further specify that each five bar groupings must contain three short bars and two tall bars. This ratio of two tall bars and three short bars for each five bar group is used as a parameter for verifying that a mark is a barcode. Accordingly, the image processor 70 examines the data identified in step 25 to identify one of the framing bars 103a, 103b. The image processor then groups subsequent bars in the barcode into five-bar-groups. Each five-bar-group is analyzed to determine the ratio of tall bars to short bars. If each five-bar-group has two tall bars and three short bars, then the image processor verifies that the mark is a barcode.

If the ratio of short bars to tall bars varies from the 3:2 ratio, the image processor may determine that the mark is not a barcode and then return to point A in FIG. 7 and continue scanning along the scan line as described in step 7. However, when the image processor identified the first framing bar, it may have incorrectly selected a tall bar in one of the five bar groups, instead of a framing bar, so that the five-bar-groupings were improperly determined. This may occur if the horizontal scan performed in steps 22 and 23 did not identify the entire width of the barcode. However, because the horizontal scan in steps 22 and 23 most likely identified at least one of the ends of the barcode, the image processor makes a second attempt to find a framing bar if the first attempt led to a determination that the five bar groupings did not have the proper ratio of small bars to tall bars.

In the second attempt to locate a framing bar, the image processor 70 analyzes the data identified in step 25 from the direction opposite the direction used in the first attempt. For example, if the image processor examined the mark from left to right in the first attempt to find a framing bar 103a then the image processor 70 examines the mark from right to left in the second attempt. Once the image processor identifies a mark that it determines is a tall bar, the image processor designates that bar as a framing bar and then proceeds to separate the bars into five bar groupings and check the ratio of small bars to tall bars. If the small bar to tall bar ratio is 2:3, the image processor designates the mark as a barcode and then proceeds to step 27. If the ratio is not 2:3, the image processor determines that the mark is not a barcode and then returns to point A in FIG. 7 and continues scanning along the scan line 150 as described in step 7.

In step 27, the image processor determines the orientation of the document based on the orientation of the barcode and the face on which the barcode was located. For instance, if the image processor locates the barcode on the face scanned by the first camera 32 and the barcode is in the right-side-up orientation, then the image processor determines that the document is in the right-side-up facing forwarding orientation. The image processor then communicates the information with the system controller 95, which electronically tags the document with the orientation data. The system controller then monitors the progress of the document through the apparatus and selectively reorients the document in accordance with the orientation data.

It will be recognized by those skilled in the art that changes or modifications may be made without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. A method for processing documents comprising the steps of:
   A) imaging a document to acquire image data representative of the document;
   B) storing the image data for the document to provide a document image;
   C) scanning the document image along a selected line in selected symmetrical areas of the document until a mark is detected;
   D) scanning along a vertical scan line in a selected vertical direction from the mark until a selected light transition point is detected;
   E) scanning along a horizontal scan line for a selected distance in a horizontal direction toward the transition point;
   F) determining the light transition pattern along the horizontal scan line;
   G) determining whether the light transition pattern conforms to a predetermined pattern to detect the presence of a barcode image in a selected symmetrical area; and
   H) determining the orientation of a document depending on the selected symmetrical area at which a barcode image is detected.

2. A method for processing documents including the following steps:
   A) imaging a document to acquire image data representative of the document;
   B) storing the image data for the document to provide a document image;
   C) scanning the document image along a selected line until a mark is detected;
   D) scanning along a vertical scan line in a selected vertical direction from the mark until a selected light transition point is detected;
   E) scanning along a horizontal scan line for a selected distance in a horizontal direction toward the transition point;
   F) determining the light transition pattern along the horizontal scan line to detect the existence of a barcode image;
   G) determining the orientation of the barcode image; and
   H) determining the orientation of the document based on the determined orientation of the barcode image.

3. An apparatus for processing documents comprising:
   A) a document transport for conveying documents along a selected path of movement;
   B) a document imager for imaging a document conveyed along the selected path of movement to provide a document image;
   C) a system controller for scanning the document image along a selected scan line until a mark is detected, scanning the document image along a vertical scan line in a selected vertical direction from the mark until a selected light transition point is detected, scanning the document image along a horizontal scan line for a selected horizontal distance toward the light transition point, determining a light transition pattern along the horizontal scan line to detect the presence of a barcode image, and determining the orientation of the document based on the barcode image.

4. An apparatus for processing documents comprising:
   A) a document transport for conveying documents along a selected path of movement;
   B) a document imager for imaging a document conveyed along the selected path of movement to provide a document image;
   C) a system controller for scanning the document image along a selected scan line in selected symmetrical areas of the document until a mark is detected, scanning the document image along a vertical scan line in a selected vertical direction from the mark until a selected light transition point is detected, scanning the document image along a horizontal scan line for a selected horizontal distance toward the light transition point, determining a light transition pattern along the horizontal scan line, determining whether the light transition pattern conforms to a predetermined pattern to detect the presence of a barcode image in a selected symmetrical area, and determining the orientation of the document based on the selected symmetrical area at which a barcode image is detected.

5. A method for processing documents, comprising the steps of:
   A) Scanning a face of a document with a scanner to acquire image data;
   B) Examining the image data to determine the presence of a mark;
   C) Analyzing the mark to determine the presence of a bar code;
   D) Determining the location of the bar code, wherein the location of the bar code on the document is variable relative to the scanner;
   E) Determining the orientation of the bar code; and
   F) Determining the orientation of the document in response to the determined location and orientation of the bar code.

6. The method of claim 5 comprising the step of scanning a second face of the document and examining the image data of the second face to determine the presence of a mark.

7. The method of claim 5 wherein the step of determining the orientation of the document comprises the step of determining whether the document is in one of a pre-defined first or second orientation.

8. The method of claim 5 wherein the step of determining the orientation of the document comprises the step of determining whether the document is in one of a pre-defined first, second, third or fourth orientation.

9. The method of claim 5 wherein the bar code includes an upper edge or a lower edge and the method comprises the step of locating the upper edge or the lower edge.

10. The method of claim 5 comprising the step of selectively reorienting the document in response to the determined orientation of the document.

11. The method of claim 5 comprising the step of conveying the document along a document path, wherein the document is scanned to acquire image data while the document is conveyed along the document path.

12. A method for processing documents comprising the steps of:
    A) Scanning a face of a document to acquire image data;
    B) Examining the image data for first and second selected scanning areas of the document to determine the presence of a mark;

C) Analyzing the mark to determine the presence of a bar code;

D) Determining that the document is in a first orientation in response to determining that the bar code is present in the first selected scanning area and determining that the document is in a second orientation in response to determining that the bar code is present in the second select scanning area.

13. The method of claim 12 wherein the scanning areas are symmetric about the center point of the document.

14. The method of claim 12 wherein the step of examining the image comprises examining the image data for third and fourth scanning areas of the document to determine the presence of a mark.

15. The method of claim 14 wherein the third and fourth scanning areas are symmetric about the center point of the document.

16. The method of claim 12 comprising the step of selecting a group of documents for processing wherein the selected documents have a common characteristic.

17. The method of claim 12 wherein the bar code has an upper edge or a lower edge and the method comprises the step of locating the upper edge or the lower edge.

18. The method of claim 12 comprising the step of selectively reorienting the document in response to the determined orientation of the document.

19. The method of claim 12 comprising the step of conveying the document along a document path, wherein the document is scanned to acquire image data while the document is conveyed along the document path.

20. A method for processing documents, comprising the steps of:

scanning a face of a document with a scanner to acquire image data;

storing images of the selected documents acquired by the image acquisition device in a non-volatile image storage medium;

examining the image data to determine the presence of a mark; analyzing the mark to determine if the mark is a bar code;

determining the orientation of the bar code;

determining the orientation of the document in response to the determined orientation of the bar code; and selectively reorienting the document in response to the determined orientation of the document.

21. The method of claim 20 wherein the step of determining the orientation of the bar code comprises determining whether the bar code is in one of a first, second, third or fourth orientation.

22. The method of claim 20 comprising the step of selecting a group of documents for processing wherein the selected documents have a common characteristic.

23. The method of claim 20 wherein the bar code includes an upper edge or a lower edge and the method comprises the step of locating the upper edge or the lower edge.

* * * * *